US012194477B2

(12) United States Patent
Fukuhara et al.

(10) Patent No.: US 12,194,477 B2
(45) Date of Patent: Jan. 14, 2025

(54) CONTINUOUS CENTRIFUGE AND AIR DISCHARGE METHOD FOR CONTINUOUS CENTRIFUGE

(71) Applicant: Eppendorf Himac Technologies Co., Ltd., Ibaraki (JP)

(72) Inventors: Eiichi Fukuhara, Ibaraki (JP); Hiroatsu Toi, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 931 days.

(21) Appl. No.: 17/289,734

(22) PCT Filed: Oct. 25, 2019

(86) PCT No.: PCT/JP2019/041960
§ 371 (c)(1),
(2) Date: Apr. 29, 2021

(87) PCT Pub. No.: WO2020/110540
PCT Pub. Date: Jun. 4, 2020

(65) Prior Publication Data

US 2022/0001398 A1 Jan. 6, 2022

(30) Foreign Application Priority Data

Nov. 29, 2018 (JP) ................................ 2018-223608

(51) Int. Cl.
*B04B 11/02* (2006.01)
*B04B 7/02* (2006.01)
*B04B 15/08* (2006.01)

(52) U.S. Cl.
CPC ................ *B04B 11/02* (2013.01); *B04B 7/02* (2013.01); *B04B 15/08* (2013.01); *B04B 2007/025* (2013.01)

(58) Field of Classification Search
CPC ........... B04B 11/02; B04B 7/02; B04B 15/08; B04B 2007/025; B04B 2005/0464; B04B 1/00; B04B 5/0442; B04B 11/04
See application file for complete search history.

(56) References Cited

U.S. PATENT DOCUMENTS

2011/0190111 A1 8/2011 Toi et al.
2013/0017943 A1 1/2013 Toi et al.

FOREIGN PATENT DOCUMENTS

CN 102527524 7/2012
CN 106163667 11/2016
(Continued)

OTHER PUBLICATIONS

"International Search Report (Form PCT/ISA/210) of PCT/JP2019/041960," mailed on Jan. 21, 2020, with English translation thereof, pp. 1-5.
(Continued)

*Primary Examiner* — Walter D. Griffin
*Assistant Examiner* — Shuyi S. Liu
(74) *Attorney, Agent, or Firm* — JCIPRNET

(57) ABSTRACT

A valve bridge portion, in which four valves A to D are connected in a bridge shape, is interposed between sample lines to a rotor of a continuous centrifuge. A microcomputer is able to open and close the valves A to D independently and is capable of switching between top feed and bottom feed to the sample line. When sample supply is started, switching between the top feed and the bottom feed is performed multiple times, and in the middle of switching and sending a sample liquid, the microcomputer executes an operation of temporarily increasing a liquid pressure multiple times by temporarily closing an outlet valve (C or D) and then immediately opening the valve. As a result of repeating the operation of switching between the said sample feed direc-
(Continued)

tions and temporarily increasing the liquid pressure, air that accumulates inside the rotor can be effectively discharged.

14 Claims, 10 Drawing Sheets

(56) References Cited

FOREIGN PATENT DOCUMENTS

| | | |
|---|---|---|
| JP | H01210056 | 8/1989 |
| JP | H10513107 | 12/1998 |
| JP | 2006021121 | 1/2006 |
| JP | 2011177703 | 9/2011 |
| JP | 2013022473 | 2/2013 |
| JP | 2014144397 | 8/2014 |
| JP | 2017012974 | 1/2017 |

OTHER PUBLICATIONS

"Office Action of China Counterpart Application" with English translation thereof, issued on Jul. 19, 2022, p. 1-p. 13.

| | valve A | valve B | valve C | valve D |
|---|---|---|---|---|
| top feed | open | closed | closed | open |
| bottom feed | closed | open | open | closed |

FIG. 8

CONTINUOUS CENTRIFUGE AND AIR DISCHARGE METHOD FOR CONTINUOUS CENTRIFUGE

CROSS-REFERENCE TO RELATED APPLICATION

This application is a 371 application of the International PCT application serial no. PCT/JP2019/041960, filed on Oct. 25, 2019, which claims the priority benefits of Japan Patent Application No. 2018-223608, filed on Nov. 29, 2018. The entirety of each of the above-mentioned patent applications is hereby incorporated by reference herein and made a part of this specification.

BACKGROUND

Technical Field

The present invention relates to a continuous centrifuge which allows a sample to continuously flow and centrifugally separates particles in the liquid sample in a rotor, and particularly, the present invention aims to be capable of removing air mixed in the sample which is sent into the rotor.

Related Art

A centrifugal separator separates particles that do not settle or hardly settle in a normal gravitational field, and for example, viruses, bacterial cells and the like are included as targets to be separated. The viruses and the bacterial cells are necessary raw materials for production of drugs, vaccines and the like, and a continuous centrifuge (a continuous centrifugal separator) is widely used as a facility for separating and refining the raw materials in these production processes. The continuous centrifuge includes a rotor that rotates at a high speed, two rotating shafts which have penetration holes that are connected to upper and lower sides of the rotor, and a sample supply portion for supplying a sample to the rotor.

With regard to the sample supply portion, a system has been proposed in which a liquid sending pump for supplying the sample, a flow meter, and a pressure gauge are connected by a silicon tube or the like. When the continuous centrifuge is rotating, the rotor must be completely filled with liquid. If the operation is performed when the liquid is not completely filled, there is a possibility that the rotor may become unbalanced and excessive vibration may occur, which is not preferable. In the worst case, the continuous centrifuge may vibrate abnormally and must be shut-down. In addition, if air remains in a sample line, there is a possibility that a pressure of the sample line when the sample is injected may become high, and the sample cannot be injected at a predetermined flow rate. In addition, a flow path for making the sample flow in a radial direction and sending the sample to a space for centrifugal separation is formed between a core body and a lower rotor cover, but because the liquid pressure increases toward an outer periphery during centrifugation, minute bubbles in the sample cannot be sent to an outermost part and the flow path is clogged, which makes the sample difficult to flow and the pressure for sending the sample increase. In order to obtain stable centrifugal separation performance in the continuous centrifuge, a low pressure for sending the sample is preferable, and thus it is important to remove the air remaining in the sample line so that the air does not enter the rotor. For example, Patent literature 1 proposes a continuous centrifuge in which whether the air is mixed in the sample line or not can be easily detected, and the air in the sample line is discharged before being injected into a rotor chamber. In addition, Patent literature 2 proposes a continuous centrifuge in which in order to effectively discharge bubbles generated on a lower side of the rotor, a direction in which a chemical solution is flowed is switched to flow the chemical solution downward from the top of a rotor for a predetermined time after the chemical solution is flowed upward from the bottom of the rotor.

LITERATURE OF RELATED ART

Patent Literature

[Patent literature 1] Japanese Patent Laid-Open No. 2013-22473

[Patent literature 2] Japanese Patent Laid-Open No. 2011-177703

SUMMARY

Problems to be Solved

When a transparent or semi-transparent tube such as a silicon tube is used as a sample line piping which is used in a continuous centrifuge, whether there is air in a sample line may be visually checked, and thus the air can be discharged from the sample line by a manual operation of an operator, such as picking up the silicon tube by hand to once increase the pressure of the sample line and then release the pressure, and the like. However, even if the air is discharged by the manual operation, not only the air cannot be completely discharged, but also the air mixed as bubbles in the sample is difficult to be discharged. As a countermeasure against the problem described above, in Patent literature 1, the bubbles are detected by an air sensor before the sample enters the rotor and are discharged to the outside via a three-way passage. However, minute bubbles below a detection limit of the air sensor and bubbles dissolved in the sample liquid cannot be detected, and thus the bubbles cannot be removed. In addition, when the sample is injected into a rotor core of a continuous centrifuge, a flow path configured by a shaft and the rotor core in the rotor is narrower than a connected tube, and thus the air is difficult to escape if the air is mixed. If an air block is caused inside the rotor core, the pressure of the line will increase and the sample injection will become difficult. Therefore, there is a case that after the rotation of the rotor starts, a flow direction of the sample to be supplied to the rotor is manually reversed in low-speed rotation area (generally about 4,000 rpm) to manually switch top feed and bottom feed multiple times, and a pump speed is increased at the same time, which takes a lot of effort.

The present invention is accomplished in view of the background described above, and an object of the present invention is to provide a continuous centrifuge and an air discharge method for a continuous centrifuge capable of effectively discharging bubbles mixed in a sample flowing into a rotor.

Another object of the present invention is to provide a continuous centrifuge and an air discharge method for a continuous centrifuge in which a plurality of valves are arranged in a bridge shape, and a flow path switching process for air releasing can be automatically conducted by control of a control portion.

Still another object of the present invention is to provide a continuous centrifuge and an air discharge method for a continuous centrifuge capable of increasing a flow speed of a sample by temporarily limiting a part of the plurality of valves and temporarily increasing a pressure in a flow path.

Means to Solve Problems

Features of typical ones of the invention disclosed in the application are described as follows. According to one feature of the present invention, a continuous centrifuge includes: a cylindrical rotor for separating a sample, a centrifuge chamber in which the rotor is accommodated, a drive mechanism for rotating the rotor, and sample lines for continuously supplying and discharging the sample to the rotor during rotation of the rotor, and in the continuous centrifuge, an operation is performed in which the sample is alternately flowed to the rotor by top feed and bottom feed while the rotor is rotated, and an operation (an air discharge mode) is performed in which the sample line is temporarily throttled in a manner as increasing a flow speed of the sample line after switching a feed direction, and then the sample line is opened. The sample lines include: a sample supply line connected to a sample tank, a sample discharge line connected to a collection tank, an upper line joined to an upper passage of the rotor, and a lower line joined to a lower passage of the roto. The sample supply line, the sample discharge line, the upper line and the lower line are bridge-connected and each of four valves a valve for opening and closing a flow path is arranged in each of four bridges, respectively.

According to another feature of the present invention, valves are operated to be opened and closed independently by a control portion which controls centrifugal separation working; and the control portion controls by the following Steps a) to d).

a) A sample supply direction to the rotor is set to top feed or bottom feed by opening only two of the four valves which face each other, b) the valve located on the discharge side among the opened valves is closed after the sample is discharged from the rotor to make a flow path pressure reach a predetermined peak pressure P2, and then the valve located on the discharge side is opened again to return the flow path pressure to a normal state, c) the two valves opened in the Step a) is closed and the rest valves are opened to reverse the sample supply direction to the rotor, and d) bubbles in the rotor are discharged by repeating the Step b) and the Step c). In addition, in the Step b), by repeating, multiple times, two operations including an operation of closing the valve located on the discharge side for a short time and an operation of opening the valve for a certain time, the flow path pressure is increased to the predetermined peak pressure P2 multiple times. The Step d) may also be executed multiple times in each of the both feed directions.

According to still another feature of the present invention, the four valves are arranged outside the centrifuge chamber, and are opened and closed using compressed air or electric power as a power source. In addition, the rotor has a cylindrical rotor body, an upper rotor cover and a lower rotor cover which are attached so as to close an upper opening and a lower opening of the rotor body, and a core which partitions an interior into a plurality of spaces for separating the sample. The upper line is connected to the upper rotor cover on an upper side of a rotation axis of the rotor body, and the lower line is connected to the lower rotor cover on a lower side of the rotation axis of the rotor body. The core of the rotor has a hollow cylindrical body portion in which blade-shaped partition walls evenly dividing the interior of the rotor into the plurality of spaces are protruded on an outer circumferential portion, and end surface portions which are arranged so as to close an upper end and a lower end of the body portion.

According to still another feature of the present invention, a liquid sending pump and a pressure gauge (a pressure sensor) are arranged in the sample supply line, and the opening and closing of the valve located on the discharge side in the Step b) is controlled by the control portion based on output of the pressure gauge. Moreover, when the top feed or the bottom feed is set, a flow path limiting mechanism, which is used for increasing a pressure of liquid on a downstream side of the rotor regardless of opening and closing the valves on the downstream side, may be arranged separately from the valve bridge portion.

Effect

According to the present invention, when a sample is supplied before centrifugal separation working, a flow direction of the sample is automatically reversed multiple times, and thus bubbles (air) accumulating in a centrifugal separation space in a rotor and a line can be effectively discharged. In addition, after the flow direction of the sample is reversed, a liquid pressure of the sample is temporarily increased by limiting (partially closing or completely closing) a valve on a downstream side of the sample line, and thus the discharge of the bubbles (air) accumulating in the rotor and the line can be promoted. In this way, in a sample injection process before the centrifugal separation working, the bubbles (air) existing inside can be reliably removed, and thus the sample can be injected at a flow rate according to a protocol determined at the time of the centrifugal separation working, and stable centrifugal separation performance can be obtained.

BRIEF DESCRIPTION OF THE DRAWINGS

FIG. 8 is a table showing an opening/closing condition of valves A to D during the top feed and the bottom feed.

DESCRIPTION OF THE EMBODIMENTS

Example 1

An example of the present invention is described below based on drawings. Moreover, in the following drawings, the same parts are designated by the same symbols and repeated description is omitted.

Figure 1:
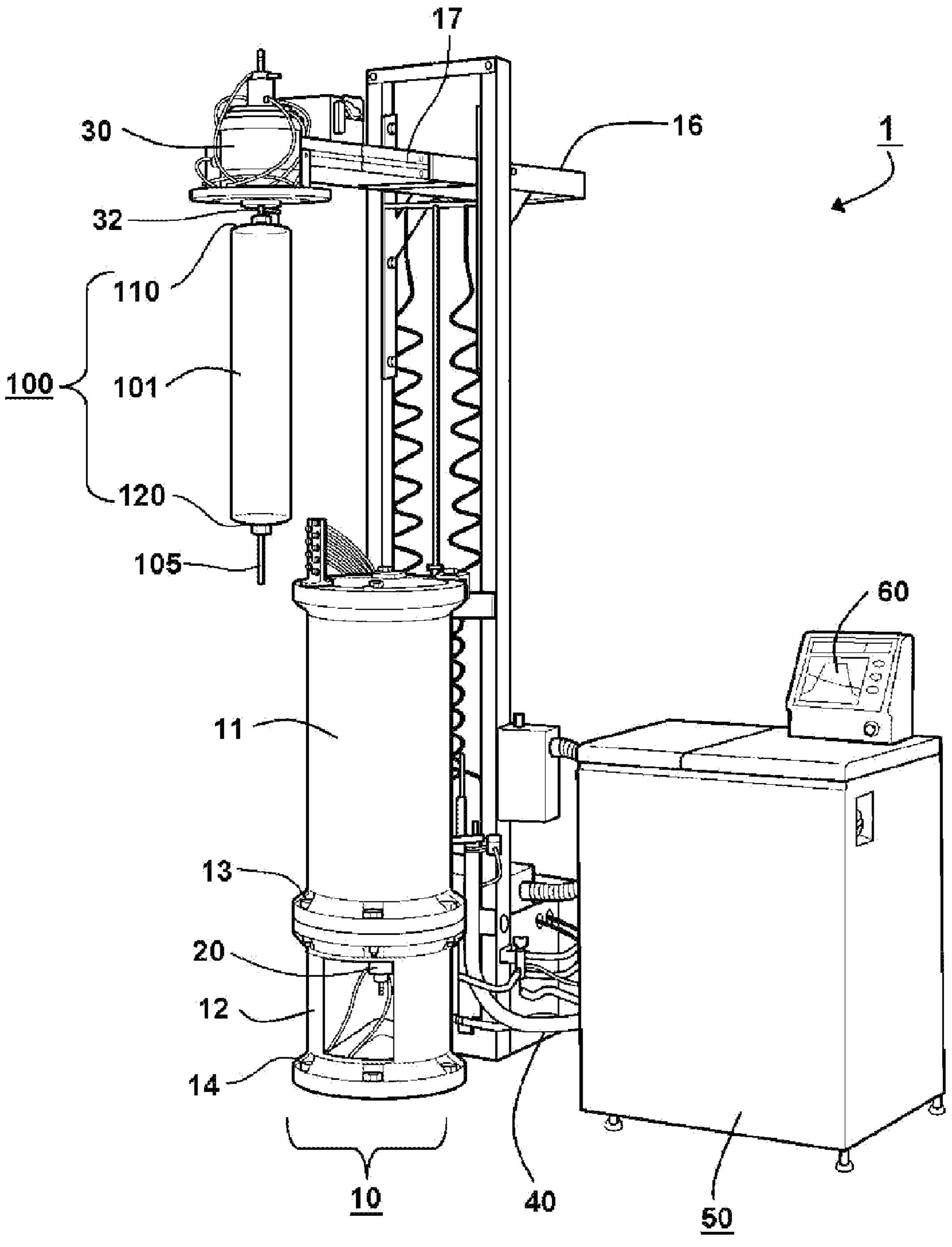
FIG. 1 is a perspective view showing an entire continuous centrifuge 1 according to an example of the present invention.

FIG. 1 is a perspective view showing an entire continuous centrifuge 1 according to the example. As shown in FIG. 1, the continuous centrifuge 1 is a so-called "continuous ultra-centrifugal separator" which is used in a vaccine manufacturing process and the like, and includes two main parts, namely a centrifugal separation portion 10 and a control device portion 50. The centrifugal separation portion 10 and the control device portion 50 are connected by a wiring/pipe group 40. The continuous centrifuge 1 has a structure in which a rotor 100 suspended by a drive portion 30 can be taken in and out of a chamber 11 by operating a lift 16 and an arm 17. The centrifugal separation portion 10 has: the cylindrical chamber 11 which is a rotor chamber; a base 12 which supports the chamber 11; the rotor 100 which is accommodated in an interior of the chamber 11 in a way of being freely taken in and out of the chamber 11 and rotates at a high speed; the drive portion 30 which is arranged above the chamber 11 and rotationally drives the rotor 100 in a state of suspending the rotor 100; a lower bearing portion 20 installed on a lower side of the chamber 11; the lift 16 and the arm 17 for moving the drive portion 30 in an up-and-down direction and a back-and-forth direction; and a liquid sending pump 77 (see FIG. 5) that continuously supplies or discharges a sample or a sterilizing solution to the rotor 100. The rotor 100 suspended by the drive portion 30 is accommodated inside the chamber 11. An outer surface of the rotor 100, which is a rotation body, includes a cylindrical rotor body 101 which is a body portion, and an upper rotor cover 110 and a lower rotor cover 120 for closing both ends of the rotor body 101 by screwing. An upper shaft 32 which is a sample passage and also serves as a rotation shaft is arranged above the upper rotor cover 110, and a lower shaft 105 which is a sample passage and also serves as a rotation shaft is arranged below the lower rotor cover 120.

Because the rotor 100 is rotationally driven at a high speed, during centrifugal separation, the interior of the chamber 11 is kept in a depressurized state for a purpose of suppressing heat generated by windage loss or frictional heat with atmosphere during operation. In order to keep the chamber 11 in the depressurized state, a not-shown discharge port which discharges air inside the chamber 11 is formed in the body portion of the chamber 11, and a vacuum pump which is not shown is connected to the discharge port. The chamber 11 is fixed to the base 12 by a plurality of bolts 13, and the base 12 is fixed to a floor surface by a plurality of bolts 14.

The control device portion 50 accommodates a cooling device (not shown) for cooling the interior of the chamber 11, the vacuum pump (not shown), a lift drive device (not shown) for moving the rotor 100 to a predetermined location, a centrifuge controller (a control device) (not shown) for driving and controlling the rotor 100, and the like. An operation panel 60 which is a place for operating/inputting is arranged on an upper part of the control device portion 50. The control device is configured by an electronic circuit (not shown) including a microcomputer and a storage device, and controls the entire continuous centrifuge including drive control of the rotor 100, drive of the liquid sending pump, and control of a plurality of valves A to D described later.

Figure 2:
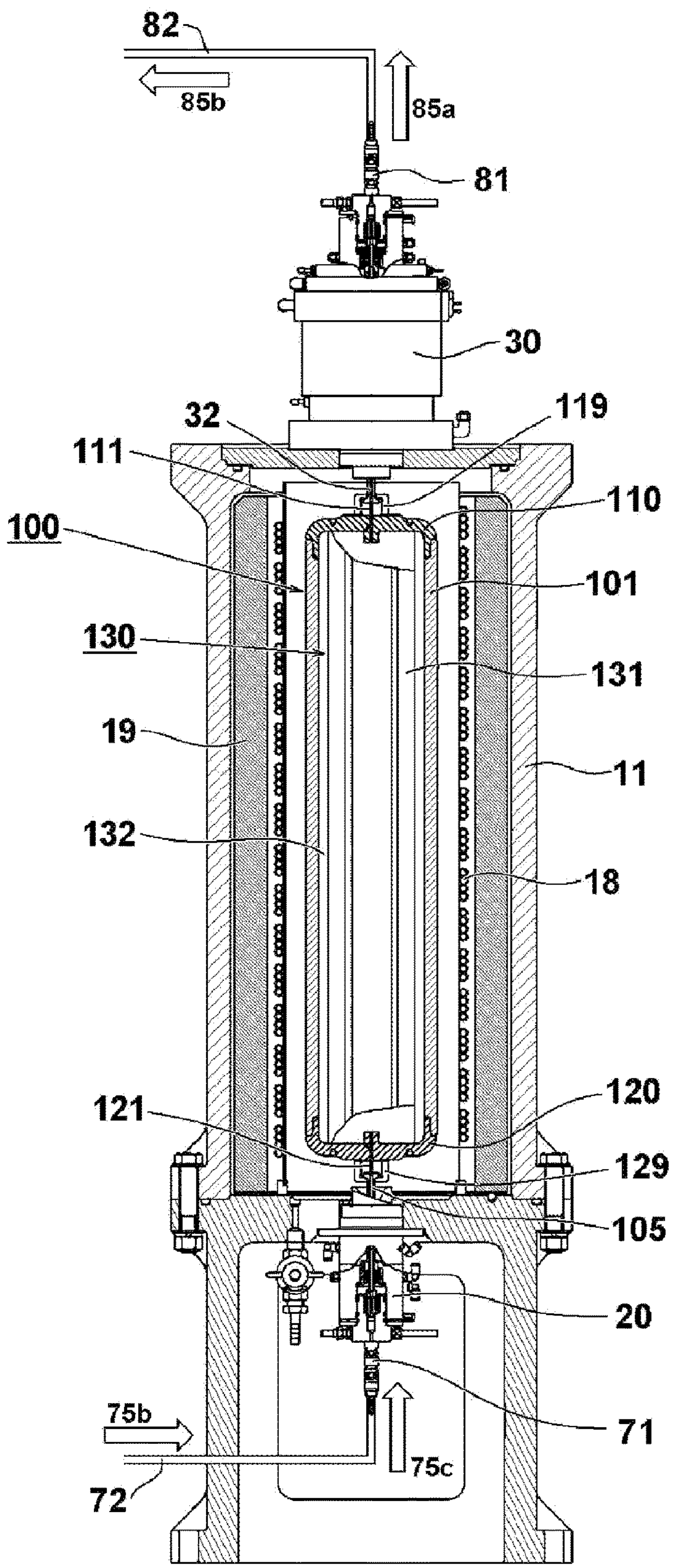
FIG. 2 is a cross-sectional view showing a detailed structure of a centrifugal separation portion 10 in FIG. 1.

FIG. 2 is a cross-sectional view showing a detailed structure of the centrifugal separation portion 10 of FIG. 1. In the chamber 11, the rotor 100 in a state of being suspended by the drive portion 30 in the interior of the chamber 11 is accommodated, a cylindrical evaporator (an evaporation pipe) 18 is installed so as to cover a circumference of the rotor 100, and a cylindrical protector 19 which functions as a defense wall is installed outside the evaporator 18. The evaporator 18 is constituted by a copper pipe for circulating refrigerant gas, and can cool the accommodation space of the rotor 100.

Inside the rotor 100, a rotor core 130 is installed for introducing an injected sample into a high gravity field. The rotor core 130 divides the interior of the rotor 100 into a plurality of centrifugal separation spaces by a core body 131 and blade-shaped partition walls 132 (132*a* to 132*f* described later with reference to FIG. 3) arranged in the body portion of the core body 131. The drive portion 30 is mounted on a distal end portion of the lift 16 (see FIG. 1), and rotatably supports the upper shaft 32. A sample passing hole extending in a vertical direction is formed at a position of an axial center in the interior of the upper shaft 32, and forms a part of an upper sample passage. A lower end portion of the upper shaft 32 extends in a funnel shape, and in order to communicate the sample passing hole and a sample passage 111 formed in the upper rotor cover 110, the upper rotor cover 110 is fixed to the upper shaft 32 by screwing a nut 119 and a second male screw 117. Moreover, an O ring 118 for sealing is arranged between the upper rotor cover 110 and the upper shaft 32. When the upper shaft 32 is rotated at a high speed by drive of a motor included in the drive portion 30, the rotor 100 connected to the upper shaft 32 also rotates at a high speed. The lower shaft 105 which is the rotation shaft portion is mounted on a lower side of the rotor core 130. A sample passing hole forming a part of the lower sample passage penetrates through an axial center of the lower shaft 105, and the sample passing hole connects a sample passage 121 formed in the lower rotor cover 120 and a lower connection portion 71.

The sample is supplied to the interior of the rotor 100 before the centrifugal separation. The sample is supplied as shown by arrows 75*b* and 75*c* via the lower pipe 72 connected to the lower connection portion 71, passes through the lower bearing portion 20, passes through the sample passing hole of the lower shaft 105, and is introduced to the interior of the rotor 100 upward from below. Introducing the sample into the rotor 100 from the sample passage 121 on the lower side in this way is called "bottom feed". When the sample sent out by the liquid sending pump 77 (described later in FIG. 5) is filled in the rotor 100, the sample is discharged from an upper pipe 82, and thus when the state is detected by a control device 51, the control device 51 controls a motor (not shown) of the drive portion 30 to accelerate the rotor 100 to a high centrifugal separation working rotation speed.

The sample introduced into the rotor 100 is moved to a high centrifugal force field by the rotor core 130 to be separated into a precipitate and a supernatant, and the supernatant (the waste liquid) passes through the sample passing hole of the upper shaft 32 from the sample passage 111 formed in the upper rotor cover 110, passes through the interior of drive portion 30, and is discharged upward from an upper connection portion 81 as shown by an arrow 85*a*. The sample which has been discharged as shown by the arrow 85*a* is sent out through the upper pipe 82 as shown by an arrow 85*b*.

Figure 3:
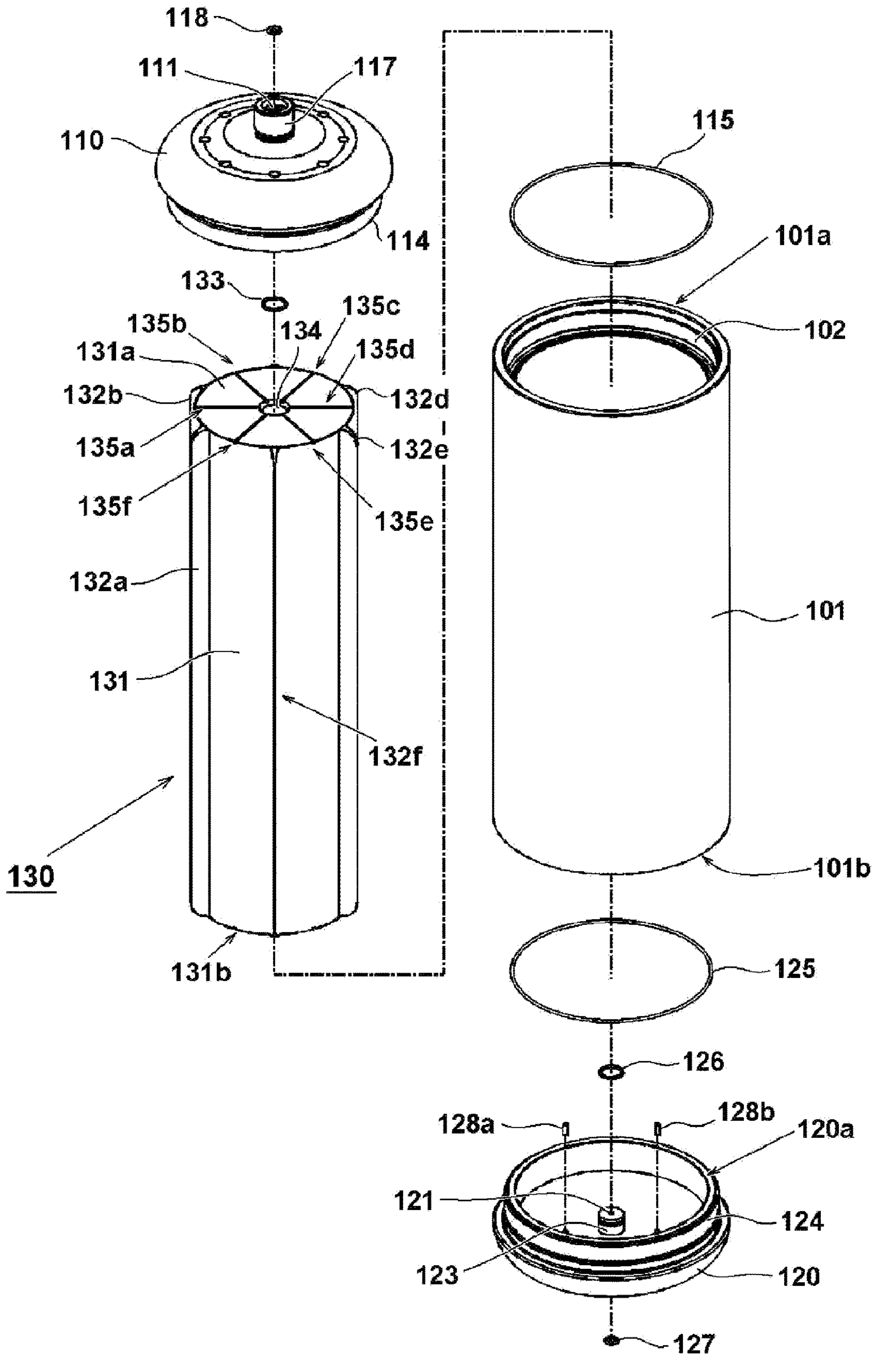
FIG. 3 is an exploded perspective view of a rotor 100 in FIG. 2.

FIG. 3 is an enlarged view of the rotor 100 in FIG. 2. The core body 131 is made of a synthetic resin, and six blade-shaped partition walls 132*a* to 132*f* protruding in a peripheral direction are formed on the outer peripheral side of the solid and columnar core body 131. The partition walls 132*a* to 132*f* are continuous in an axial direction and integrally formed with the core body 131, and outer peripheral side end portions of the partition walls 132*a* to 132*f* abut the inner peripheral surface of the rotor body 101, and thereby the separation space 137 (see FIG. 4) is evenly divided into six spaces in the peripheral direction. The core body 131 has a sample passing hole 134 at a rotation center of each of an upper surface 131*a* and a lower surface 131*b*, and a plurality of core end surface grooves 135*a* to 135*f* extending from the sample passing hole 134 in the radial direction are formed. The upper surface 131*a* and the lower surface 131*b* of the core body 131 are respectively in contact with a lower surface of the upper rotor cover 110 and an upper surface of the lower rotor cover 120, and thereby six sample passages extending in the radial direction are formed between the core body 131 and the rotor covers. Here, the outer edges of the core end surface grooves 135*a* to 135*f* open near the middle of the six partition walls 132*a* to 132*f* arranged at equal intervals on the outer peripheral side of the core body 131. A shape of the bottom surface portion of the core body 131 is basically the same as a shape of the upper surface. The upper rotor cover 110 and the rotor body 101 are a screwed type, a male screw 114 is formed on a lower end of a cylindrical surface of the upper rotor cover 110, and a female screw 102 is formed in an upper opening 101*a* of the rotor body 101. Similarly, the lower rotor cover 120 and the rotor body 101 are a screwed type, a male screw 124 is formed on a upper end of a cylindrical surface of the lower rotor cover 120, and a female screw (not visible in the diagram) is formed in a lower opening 101*b* of the rotor body 101.

A fitting shaft 123 is formed along a central rotation shaft center on an inner side of the lower rotor cover 120, and the sample passage 121 is formed at the shaft center. An O ring 125 is interposed between the lower rotor cover 120 and the rotor body 101, and an O ring 126 is interposed between the fitting shaft 123 and a fitting hole (not visible in the diagram) formed in the lower surface of the core body 131. Similarly, an O ring 115 and an O ring 133 are also interposed between the upper rotor cover 110 and the rotor body 101. Pins 128*a* and 128*b* which are fitted into positioning holes arranged on the lower surface of the core body 131 are attached to two places on the upper circumference of the lower rotor cover 120.

Figure 4:
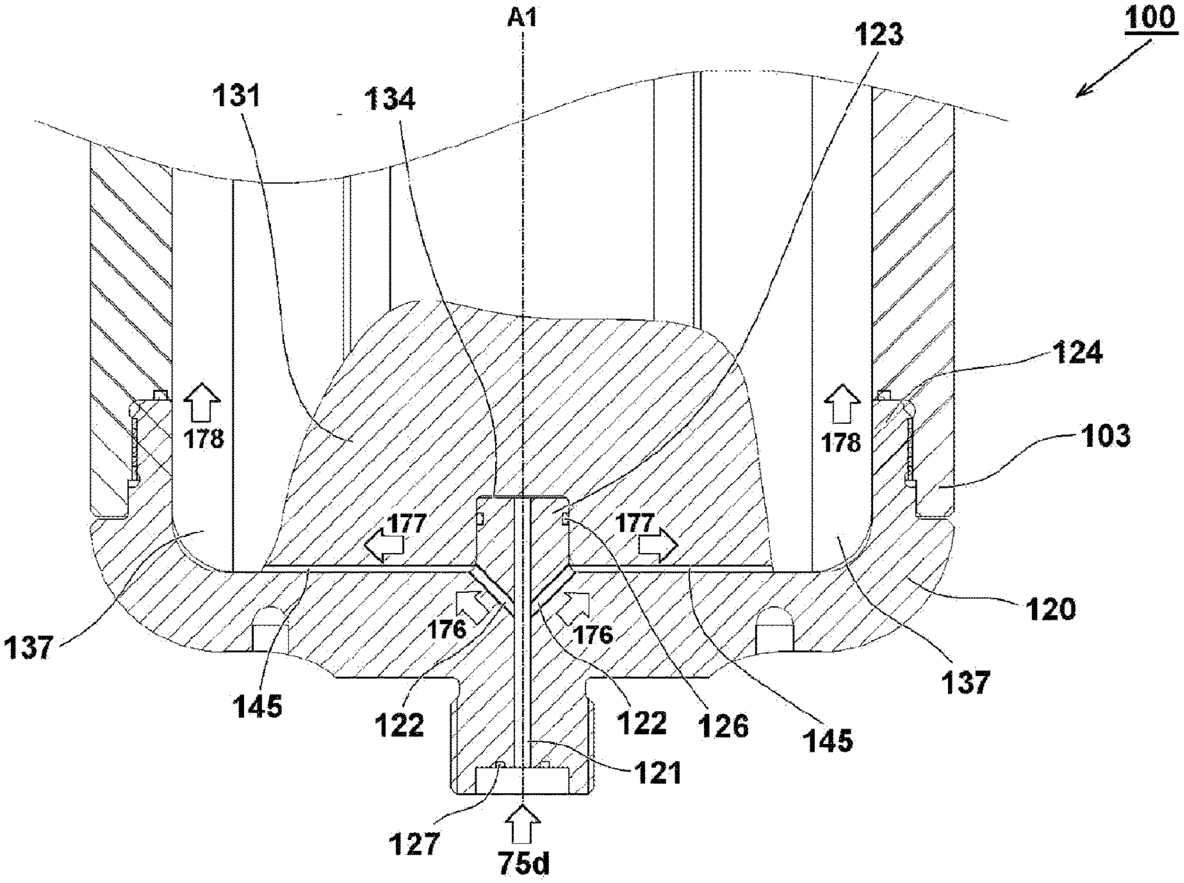
FIG. 4 is a longitudinal cross-sectional view of main portions near a bottom part of the rotor 100 in FIG. 3.

FIG. 4 is a cross-sectional view of main portions near the bottom part of the rotor 100. The cross section is a longitudinal cross-sectional view of a vertical surface passing through a rotation axis A1. A sample passage 121 extending along the rotation axis A1 and sample branch passages 122 formed in a manner of obliquely branching from a way of the sample passage 121 are formed in the lower rotor cover 120. The sample passage 121 communicates with a sample communication hole formed in the lower shaft 105 (see FIG. 2). The lower shaft 105 is fixed to the lower rotor cover 120 by a nut 129. Moreover, an O ring 127 is arranged between the lower rotor cover 120 and the lower shaft 105.

When the motor (not shown) of the drive portion 30 rotates, the upper shaft 32 rotates, and the entire rotor 100 also rotates in synchronization with the upper shaft 32. Because the lower shaft 105 is rotatably supported by the lower bearing portion 20 (see FIG. 2), the lower shaft 105 rotates together with the rotor 100. Because the plurality of sample branch passages 122 branching in the oblique radial direction from the way in the sample passage 121 are formed, the sample flowing from the sample passage 121 in a direction of an arrow 75*d* flows upward and radially outward through the sample branch passages 122 as shown by arrows 176, and reaches radial passages 145. Hereinafter, the sample flows through the radial passages 145 in directions of arrows 177, and then reaches the separation spaces 137. In the separation space 137, the sample continuously flows in a direction of an arrow 178 (upward) and the centrifugal separation working is performed. Because the sample passage 121, the sample branch passage 122, and the radial passage 145 have a small diameter and have a bent connection part, minute bubbles dissolved in the liquid are easy to accumulate in the bent part. In addition, when the sample is injected during the rotation of the rotor, bubbles having a low specific gravity are difficult to flow radially outward through the sample branch passage 122 and are easy to stagnate. Therefore, in the example, as described later, the flow direction of the sample is reserved at least once between bottom feed and top feed. Furthermore, an operation is performed in which a liquid sending pressure is intermittently increased even during the sample feed, and thereby the bubbles are separated from the accumulation part.

Figure 5:
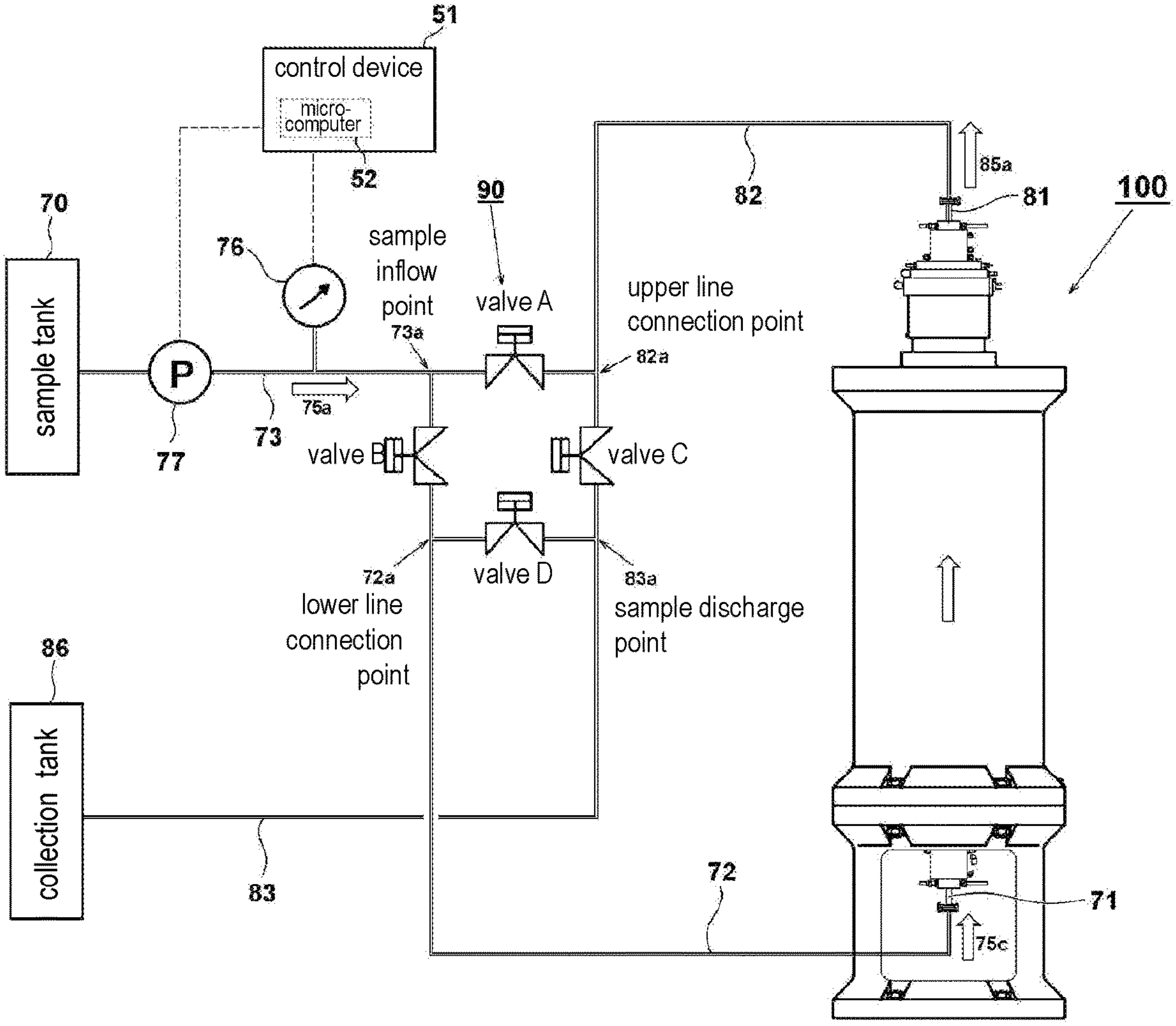
FIG. 5 is a piping diagram of a sample line of the centrifugal separation portion 10 in FIG. 1.

FIG. 5 is a piping diagram of a sample line of the centrifugal separation portion 10. In the specification, a series of lines (the flow paths) from a sample tank 70 to a collection tank 86 excluding the interior of the rotor 100 are defined as a "sample line". The sample to be centrifugally separated flows, from the sample tank 70 storing the sample through a supply pipe 73 in a direction of an arrow 75*a* by the liquid sending pump 77, and flows into a sample inflow point 73*a* of a valve bridge portion 90 through the liquid sending pump 77. A pressure sensor (a pressure gauge) 76 is connected on the way of the supply pipe 73. The pressure sensor 76 measures a pressure of the liquid supplied to the sample line. A microcomputer 52 can control the drive of the liquid sending pump 77 by acquiring pressure data from the pressure sensor 76, and can drive the liquid sending pump 77 to send the sample to the rotor 100.

The valve bridge portion 90 is a flow path switching mechanism configured by four bridge-connected valves A to D. By the valve bridge portion 90, a first flow path direction (the bottom feed) in which the sample is flowed from the lower pipe 72 toward the upper pipe 82 and a second flow path direction (the top feed) in which the sample is flowed from the upper pipe 82 toward the lower pipe 72 are switched. Among four connection points of the valve bridge portion 90, two connection points on the tank side are the sample inflow point 73*a* of the sample supplied from the sample tank 70 by the sample supply line and a sample discharge point 83*a* for discharging the sample to the collection tank 86 via the sample supply line. The rest two connection points on the rotor 100 side are a lower line connection point 72*a* connected to the lower pipe 72 and an upper line connection point 82*a* connected to the upper pipe 82. The valves A to D are respectively the same components, and can be opened and closed using high-pressure air as a drive source to control whether to open or close the flow path. The opening/closing operation of the valves A to D is performed according to an instruction of the microcomputer 52 included in the control device 51. Moreover, the types of the valves A to D are arbitrary, and an electromagnetic valve using electric power may be used as long as the opening/closing control can be directly or indirectly executed according to the instruction of the microcomputer 52. In addition, with regard to the valves A to D, a valve which can select only two positions, namely “a fully open position” or “a fully closed position”, is sufficient, and an opening adjustable valve may also be used which is capable of selecting any intermediate position such as half opening or the like.

The lower pipe 72, the upper pipe 82, the supply pipe 73, and a discharge pipe 83 can be appropriately set to a pipe with elasticity such as a silicon tube, a pipe with no elasticity such as a stainless pipe, or the like. However, in order to perform an air releasing process of the application, the stainless pipe or the like with no elasticity is preferable. The control device 51 includes the microcomputer 52, and performs, by executing a computer program, the management of the entire centrifugal separation working including the control of the delivery and discharge of the sample by the drive of the liquid sending pump 77, the control of the opening and closing of the valves A to D of the valve bridge portion 90, and the pressure measurement of the sample by using the pressure sensor 76. The liquid sending pump 77 is driven by the control of the microcomputer 52 as shown by the dotted line. The output of the pressure sensor 76 is transmitted to the microcomputer 52 by a signal line. Although not shown here, air pipes for sending out the high-pressure air are connected to the valves A to D of the valve bridge portion 90, and the opening/closing operation of the valves A to D is performed in a manner that the microcomputer 52 controls the supply or cutoff of the high-pressure air to each air pipe. With respect to the direction of the continuous sample injection into the interior of the rotor 100 during the centrifugal separation working, the so-called bottom feed is general in which the injection is performed from the lower side as shown by the arrow 75*c* of FIG. 5 and the separated supernatant liquid (the supernatant) is discharged to a discharge line (not shown) from an upper side of the rotor 100 via a sample passing hole of the upper shaft 32 as shown by the arrow 85*a*, and the injection may also be performed by the top feed.

Figure 6:
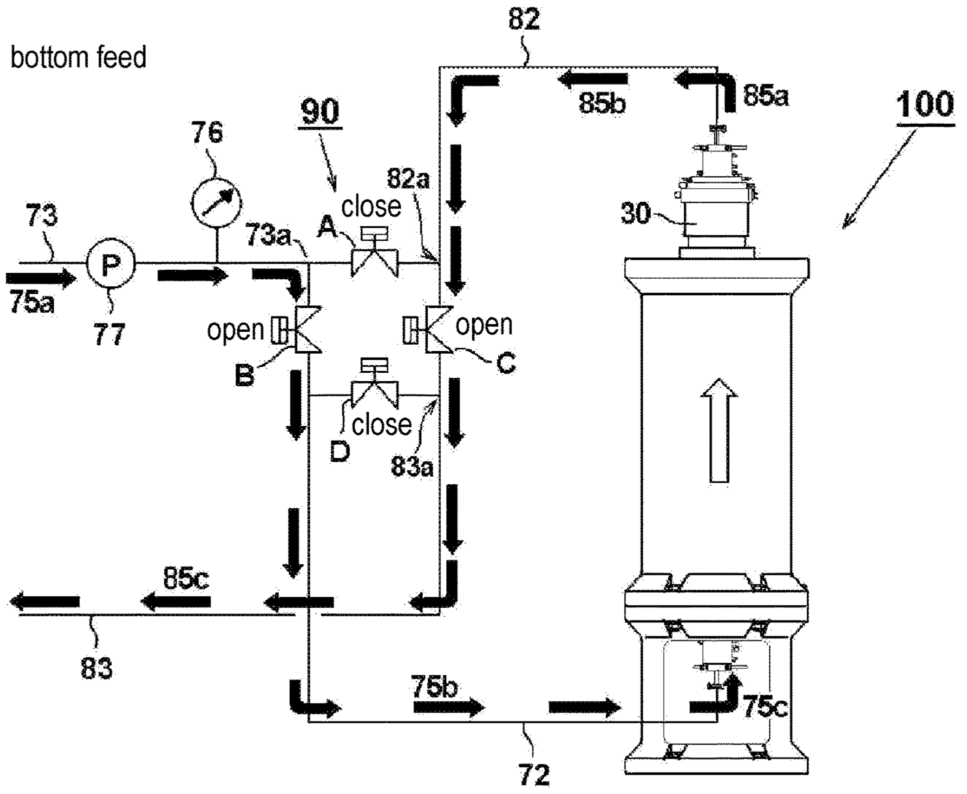
FIG. 6 is a diagram showing a flow of a sample to the rotor 100 by bottom feed.

FIG. 6 is a diagram showing a flow of the sample to the rotor 100 by the bottom feed. When the bottom feed is set in the valve bridge portion 90, the sample flowed into the valve bridge portion 90 as shown by the arrow 75*a* passes through the lower pipe 72 and flows into the interior of the rotor 100 from the lower bearing portion 20 of the rotor 100 as shown by the arrows 75*b* and 75*c*. In order to form this flow path, in the valve bridge portion 90, the valves A and D are closed, and the valves B and C are opened. If the valves A to D are operated in this way, the bottom feed can be realized in which the sample flows from the lower side toward the upper side in the interior of the rotor 100. When the bottom feed is performed and the rotor 100 is rotated at a high speed, the separated supernatant (the waste liquid) flows into the drive portion 30 through the upper shaft 32 (see FIG. 1), flows from the drive portion 30 through the upper pipe 82 as shown by the arrows 85*a* and 85*b*, flows into the valve bridge portion 90 from the upper line connection point 82*a*, passes through the sample discharge point 83*a* and flows through the discharge pipe 83 as shown by an arrow 85*c*, and reaches the collection tank 86 (see FIG. 5).

Figure 7:
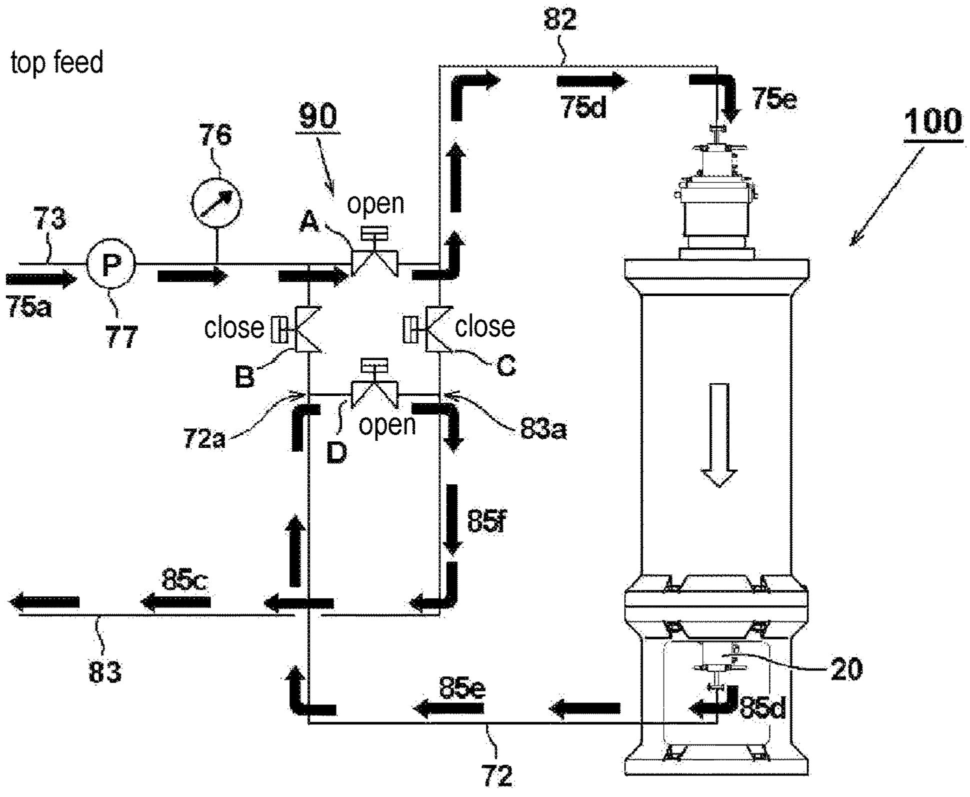
FIG. 7 is a diagram showing a flow of the sample to the rotor 100 by top feed.

FIG. 7 is a diagram showing a flow of the sample to the rotor 100 by the top feed. During the top feed, in the valve bridge portion 90, the valves B and C are closed, and the valves A and D are opened. If the valves A to D are operated in this way, the top feed can be realized in which the sample flows from the sample tank 70 as shown by arrows 75*a*, 75*d*, and 75*e*, and flows from the upper side toward the lower side in the interior of the rotor 100. When the top feed is performed and the rotor 100 is rotated at a high speed, the separated precipitate liquid flows into the lower bearing portion 20 through the lower shaft 105 (see FIG. 1), flows from the lower bearing portion 20 through the lower pipe 72 as shown by arrows 85*d* and 85*e*, flows into the valve bridge portion 90, passes through the sample discharge point 83*a* and flows through the discharge pipe 83 as shown by the arrows 85*f* and 85*c*, flows into the valve bridge portion 90 from the lower line connection point 72*a*, passes through the sample discharge point 83*a* and flows through the discharge pipe 83 as shown by the arrow 85*c*, and reaches the collection tank 86 (see FIG. 5).

In a table in FIG. 8, open/closed states of the valves A to D during the top feed and the bottom feed are summarized. In the switching from the top feed to the bottom feed, the open/closed state of each valve is reversed, and a state of the valves A, B, C, D=(open, closed, closed, open) may be switched to the valves A, B, C, D=(closed, open, open, closed). Similarly, in the switching from the bottom feed to the top feed, the open/closed state of each valve is reversed, and a state of the valves A, B, C, D=(closed, open, open, closed) may be switched to the valves A, B, C, D=(open, closed, closed, open). If only the switching control between the top feed and the bottom feed is performed in this way, the valves A and D may be supplied with the high-pressure air by a common air hose, and the valves B and C may be supplied with the high-pressure air by a common air hose. However, in the example, the valves A to D are configured in a manner that each of the valves A to D can be controlled to be opened/closed independently, and an operation is repeated multiple times at intervals in which a liquid pressure inside the flow path is temporarily increased by temporarily limiting (closing or throttling) a part of the valves, and the increased hydraulic pressure is immediately released. The control method is described with reference to FIG. 9.

Figure 9:
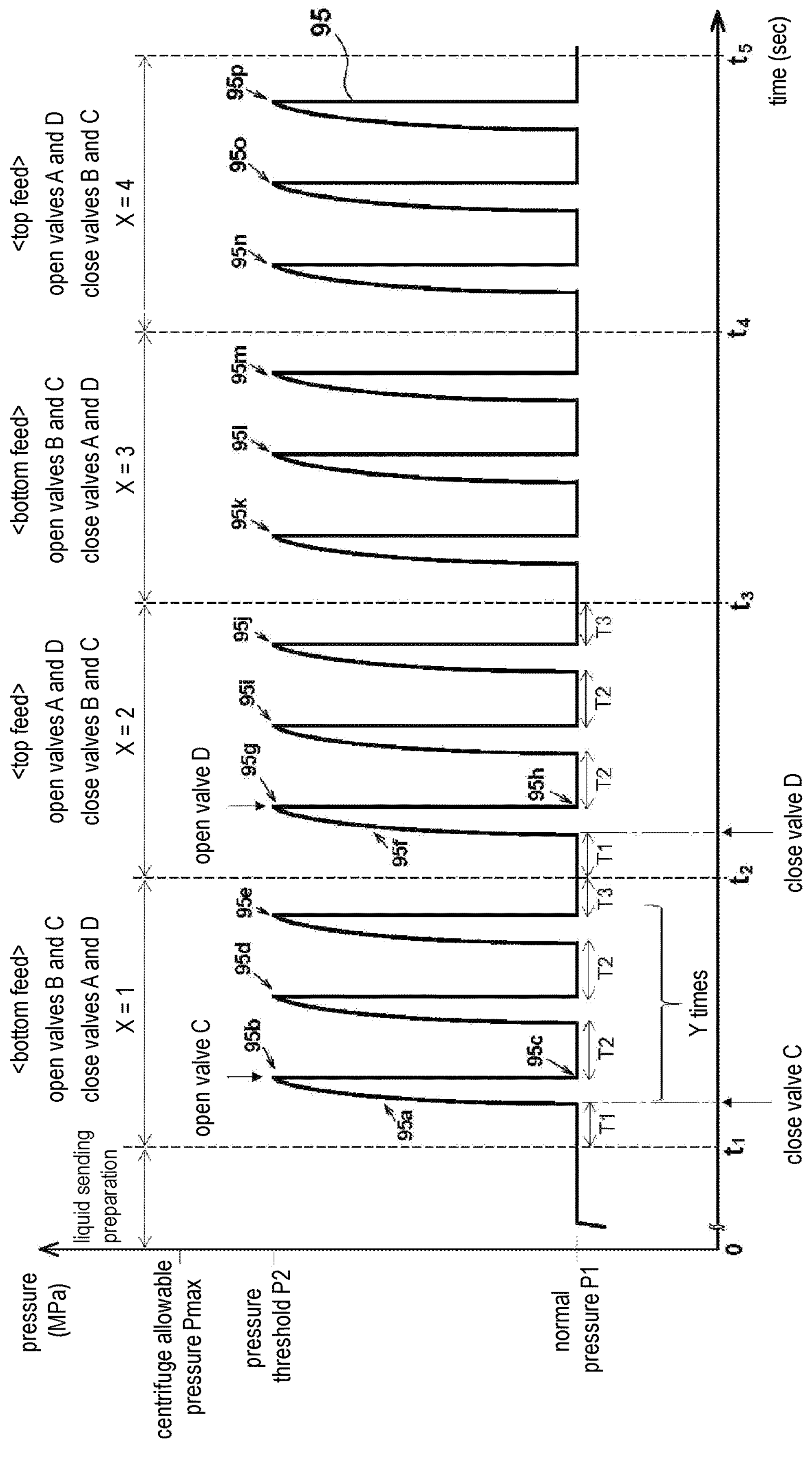
FIG. 9 is a diagram showing a switching operation between the top feed and the bottom feed in the example and a pressure 95 at that time.

FIG. 9 is a diagram showing the switching operation between the top feed and the bottom feed in the example and a pressure 95 at that time. The horizontal axis is the passage of time (unit: sec.), and the vertical axis is the pressure measured by the pressure sensor (unit: MPa). Here, a transition of the pressure 95 is shown when the bottom feed and the top feed are switched twice, and the number of times Y of applying pressure fluctuations in each feed is set to 3. Before the centrifugal separation is performed, firstly the bottom feed is set in a manner that the valves A, B, C, D=(closed, open, open, closed). Next, as a preparatory process, before the rotor 100 is rotated, the liquid sending pump 77 is operated and liquids having different densities (density liquids) are sequentially added into the rotor by the bottom feed. For example, after a liquid having a low density is added, a liquid having a high density is added, and the separation space 137 (see FIG. 2) is filled with layers of the liquids having different densities. When the interior of the rotor 100 is filled with the liquid, the liquid reaches the valve bridge portion 90 from the upper pipe 82 and is discharged from the sample discharge point 83*a*. After the state is reached, the rotor 100 is rotated at a low speed, for example, to 4000 rpm, and after the rotor is stabilized, the air releasing process according to the example is executed form timing $t_1$ to timing $t_5$.

At the timing $t_1$, while the bottom feed state is maintained, a waiting state is maintained until a certain time T1 (seconds) elapses, and then the valve C is closed. That is, the valves A, B, C, D=(closed, open, closed, closed). Then, the pressure 95 of the liquid rapidly increases as shown by an arrow 95*a*. Here, when the pressure 95 reaches a predetermined pressure threshold (a peak pressure) P2 as shown by an arrow 95*b*, the microcomputer 52 opens the valve C, and returns the state to the state of the valves A, B, C, D=(closed, open, open, closed). Then, the pressure of the liquid sharply decreases from P2 and returns to a normal feed pressure P1 as shown by an arrow 95*c*. When the normal feed pressure P1 elapses for a certain time T2 (seconds), the valve C is closed again to increase the pressure, and when the pressure reaches the pressure threshold P2 as shown by an arrow 95*d*, the valve C is opened. In this way, the state, in which the valve C is closed to act as a flow path limiting mechanism for making the pressure reach the pressure threshold P2, and the pressure threshold P2 is used as the peak pressure, is repeated three times as shown by the arrows 95*b*, 95*d*, and 95*e*. Thereafter, the waiting state is maintained for a time T3 (seconds), and the air releasing process at the time of the first feed is completed.

Next, at the timing $t_2$, the bottom feed is switched to the top feed in a manner that the valves A, B, C, D=(open, closed, closed, open). At this time, the state may be maintained in which the liquid sending pump 77 is operated. A waiting state is maintained until a certain time T1 (seconds) elapses from the timing $t_2$, and then the valve D is closed. That is, the valves A, B, C, D=(open, closed, closed, closed). Then, the pressure 95 of the liquid rapidly increases as shown by an arrow 95*f*. Here, when the pressure 95 reaches the predetermined pressure threshold P2 as shown by an arrow 95*g*, the microcomputer 52 opens the valve D, and returns the state to the state of the valves A, B, C, D=(open, closed, closed, open). Then, the pressure of the liquid sharply decreases from P2 and returns to the normal feed pressure P1 as shown by an arrow 95*h*. When the normal feed pressure P1 elapses for the certain time T2 (seconds), the valve D is closed again to increase the pressure, and when the pressure reaches the pressure threshold P2 as shown by an arrow 95*i*, the valve D is opened. In this way, the state in which the valve D acting as a flow path limiting mechanism is closed to make the pressure reach the pressure threshold P2 is repeated three times as shown by the arrows 95*g*, 95*i*, and 95*j*. Thereafter, the waiting state is maintained for the time T3 (seconds), and the air releasing process at the time of the second feed is completed.

Similarly, the top feed is switched to the bottom feed at the timing $t_3$ to produce three pressure peaks as shown by arrows 95*k* to 95*m* by the air releasing process at time of the third feed. Finally, the bottom feed is switched to the top feed at the timing $t_4$ to produce three pressure peaks as shown by arrows 95*n* to 95*p* by the air releasing process performed by the second top feed. Finally, the top feed is switched to the bottom feed at the timing is in a manner that the valves A, B, C, D=(closed, open, open, closed), and the entire air releasing process is completed. Here, the time T1, the time T2, and the time T3 may be appropriately set, for example, T1, T2, and T3 can be set to about several seconds.

In this way, in the example, in a sample feed which includes the valve bridge portion 90 performing the flow path switching, the pressure sensor 76 capable of measuring the line pressure, and the liquid sending pump 77 supplying the sample, after the rotor 100 is stabilized at the low-speed rotation, the first air releasing procedure by the switching operation between the bottom feed and the top feed is performed. Furthermore, in the example, after the feed direction is set, the second air releasing procedure is performed so as to generate a pressure increase which occurs in a short time once or more. During the switching, the sample is flowed by the top feed or the bottom feed, and the line pressure temporarily increases to the peak pressure which is the pressure threshold P2 determined previously and does not exceed an allowable pressure Pmax of the centrifuge. That is, an air discharge mode for performing an operation is realized, and in the operation, the pressure of the liquid is increased to the threshold P2 by closing one of the valves in the open operation, and after the pressure reaches the threshold P2, the valve which is temporarily closed is opened again. As a result, the bubbles contained in the sample in the rotor 100 can be automatically removed by the automatic control performed by the control device 51. After the timing $t_5$, the rotor 100 is accelerated to high-speed rotation, the sample is sent to the rotor 100 from the lower pipe 72, and the continuous centrifugal separation working is executed by the high-speed rotation of the rotor 100.

Figure 10:
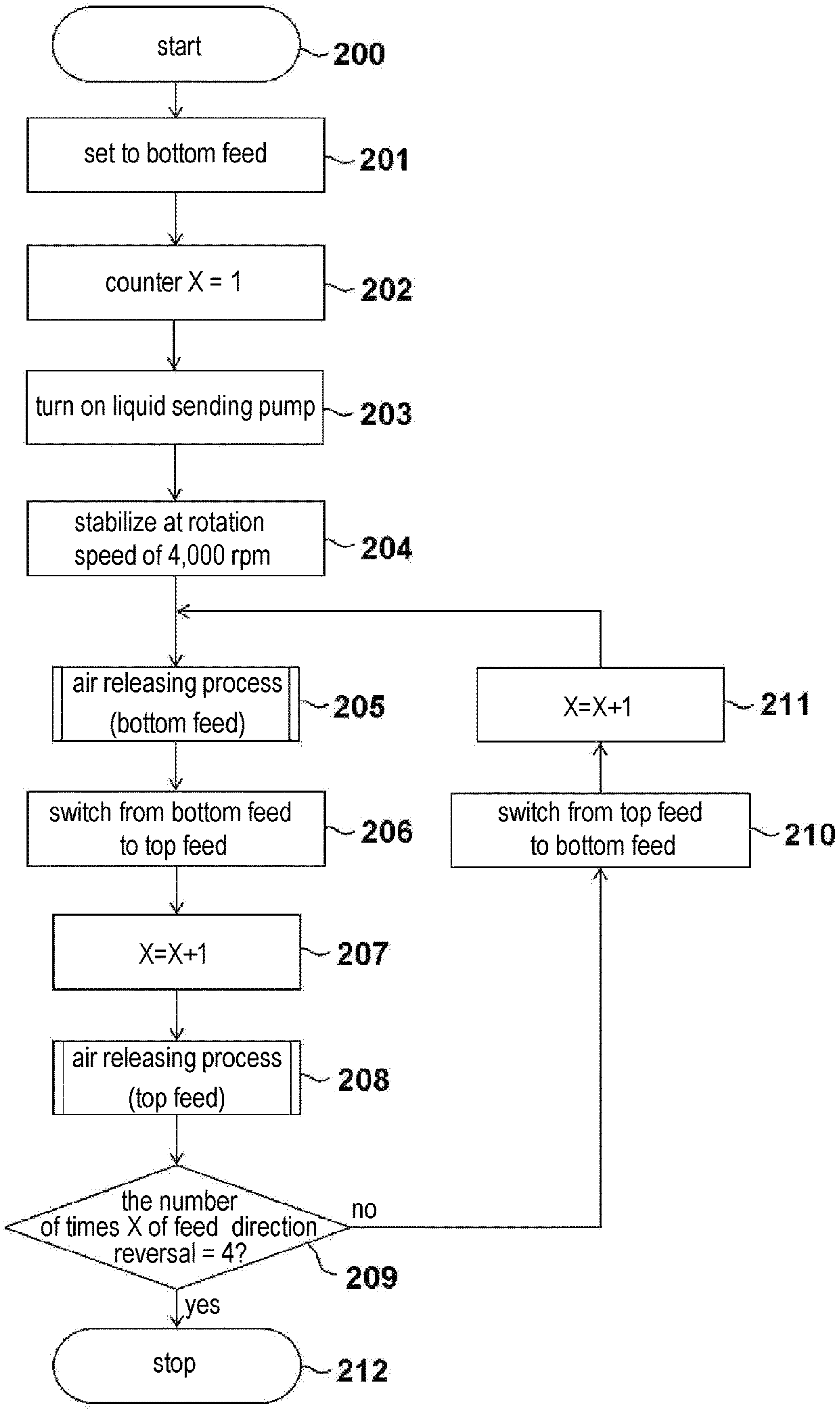
FIG. 10 is a flowchart showing a switching control procedure between the top feed and the bottom feed.

Next, a procedure of the air releasing process by the continuous centrifuge 1 is described with reference to a flowchart of FIG. 10. The air releasing process according to the example is a preparatory stage immediately before performing the continuous centrifugal separation working, that is, a stage in which the interior of the rotor 100 is filled with the sample and the rotor 100 is once rotated at a low speed before the high-speed rotation, and the air releasing process is conducted by the control device 51 (see FIG. 5) having the microcomputer 52. First, the sample is set in the sample tank 70, the bottom feed is set by opening the valves B and C and closing the valves A and D (Step 201). Next, a counter for counting the setting number of times of the feed direction is set to 1 (Step 202), the liquid sending pump 77 is operated for supplying the sample to the interior of the rotor 100, and the sample is injected from the lower connection portion 71 (Step 203). When the interior of the rotor 100 is filled with the sample, the sample comes out from the upper connection portion 81, and thus when the sample comes out, the rotor 100 is rotated at a low speed, for example, accelerated to 4,000 rpm, and stabilized (Step 204). Normally, the pressure of the liquid sending in the sample line at this time is sufficiently smaller than the allowable pressure Pmax of the continuous centrifuge 1 (see FIG. 9). When the sample is supplied to the rotor 100 in this way, the air releasing process is executed in which the valve (here is the valve C) of the two open valves which is on a downstream side in the inflow direction is temporarily closed, and the air releasing is conducted once or more (Step 205). The detailed procedure of the air releasing process (Step 205) is described later with reference to FIG. 11.

When the air releasing process (Step 205) at the time of the bottom feed is completed, the microcomputer 52 opens the valves A and D and closes the valves B and C, thereby switching the bottom feed to the top feed (Step 206), and the counter of the setting number of times of the feed direction is increased by one (Step 207). Next, the microcomputer 52 supplies the sample by the top feed and conducts the air releasing process conducted in FIG. 9 of temporarily closing the valve D (Step 208). The procedure of the air releasing process (Step 208) is the same as the procedure in Step 205 except that the object of the valve to be opened and closed is different, and the detailed procedure is described later with reference to FIG. 11. When the air releasing process (Step 208) is completed, the microcomputer 52 judges whether or not the feed direction reversal number of times N has reached the specified number of times of four times, and when the feed direction reversal number of times X does not reach the specified number of times, the bottom feed is set by opening the valves B and C and closing the valves A and D (Step 210), the counter of the setting number of times is increased by one (Step 211), and the process proceeds to Step 205. Steps 205 to 208 are executed again, and when the feed direction reversal number of times X reaches four in Step 209, the air releasing process is completed (Step 212).

When the air releasing process is completed, that is, when the timing $t_5$ of FIG. 9 is reached, the microcomputer 52 executes the centrifugal separation working by making the rotor 100 rotate at a high speed. The control procedure of the centrifugal separation working is the same as a control procedure of a conventional continuous centrifuge, and thus the description here is omitted.

Figure 11:
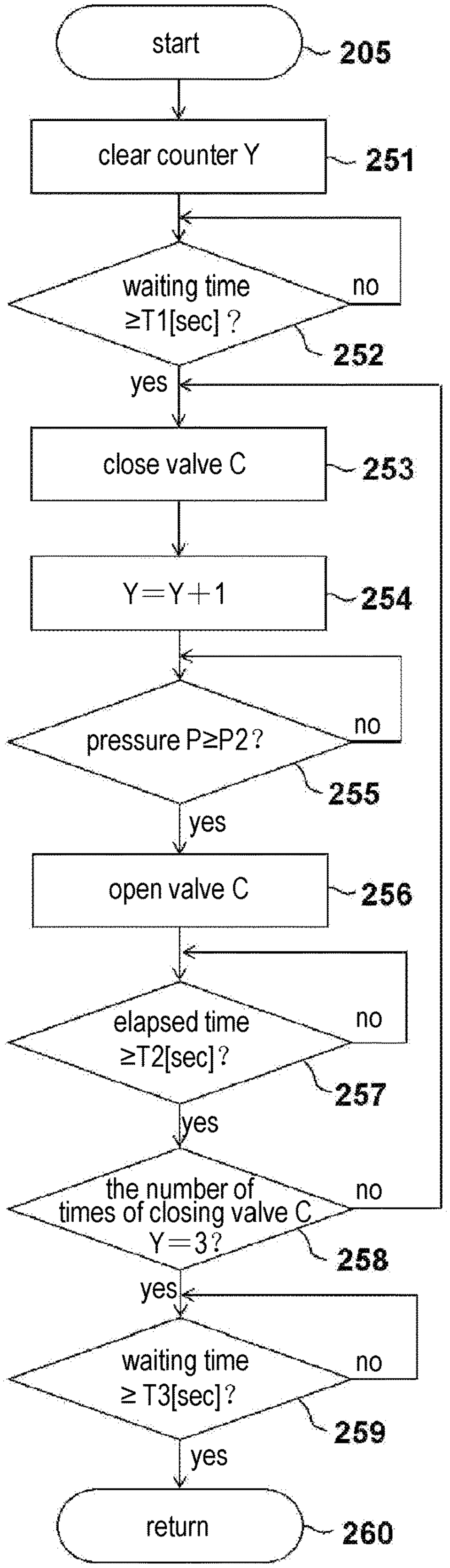
FIG. 11 is a flowchart showing a control procedure of an air releasing process (Step 205) in FIG. 10.

Next, the detailed procedure of the air releasing process (Step 205) is described with reference to FIG. 11. First, the microcomputer 52 clears the counter, which is set for counting the pressure increase number of times Y after the feed direction is set (Step 251), to 0, and waits for T1 seconds (Step 252). When T1 seconds elapses, the microcomputer 52 closes the valve C of the two open valves B and C which is on the downstream side in the flow direction (Step 253). At this time, the counter is increased by one (Step 254). If the valve C is closed, the flow path is closed, and thus the line pressure is gradually increased. If the pressure 95 reaches the threshold P2 as shown by the arrow 95*b* of FIG. 9, when the microcomputer 52 opens the valve C, the sample remaining in the line is discharged at once (Steps 255 and 256). By sharply changing the pressure 95 of the sample in a manner of P1 to P2 to P1 in this way, even the minute bubbles accumulating in the rotor 100 can be effectively moved.

Next, the microcomputer 52 waits until the predetermined time T2 elapses (Step 257), judges whether or not the counter indicating the number of times that the valve C is closed reaches the specified value (here is 3), and if the counter does not reach the specified value, the process returns to Step 253, and Steps 253 to 257 are repeated Y times in total. If the counter reaches the specified value of 3 in Step 258, the microcomputer 52 waits until the predetermined time T3 elapses (Step 259), and the process returns to the original Step 205. In this way, the bottom feed and the top feed are switched X times in total, and the pressure increase and the flow path opening operation are respectively performed Y times when each feed is executed. As described above, by repeatedly applying the pressure fluctuation in the line and arranging the "air discharge mode" for switching the flow direction, the bubbles mixed in the flow path are almost discharged from the line.

Moreover, in Step 255, when the pressure threshold P2 is reached, the valves which can be automatically controlled by the microcomputer 52 are opened and closed, and the rotation speed of the liquid sending pump 77 may also be controlled at the same time. By setting the rotation speed of the liquid sending pump 77 higher than a rotation speed used during a normal sample injection, the flow speed in the pipe can be sharply increased, and thus the air is easily released, and at the same time the time required to reach the pressure threshold P2 can be shortened, and thus the tact time for completing the air releasing process performed X=4 times can be shortened.

Meanwhile, the function of the "air discharge mode" can be utilized not only in the air releasing process, but also in a stopped CIP process (a line cleaning process). In many cases, stains which are derived from the sample inside the rotor and the core after the centrifugal separation are generally line-cleaned using an alkaline aqueous solution, and are further cleaned using WFI in order that no alkaline components remain, and it is necessary to prevent stains and alkaline components from remaining in the dead space. If the above control method is adopted, the pressure, the flow direction, the flow speed, and the like of the line can be automatically changed, and the cleanability of the wetted portion after the centrifugal separation is expected to be improved. Furthermore, by combining with a method of cleaning a line while rotating a rotor at a low speed, which is shown in Japanese Patent Laid-Open 2011-177703, the cleaning effect is expected to be further improved.

Moreover, in many cases, for a sample feed system which is a separate device from the continuous centrifuge 1, a four-way valve which plays a role of the valves A to D even in conventional products is adopted. The above is described in the form of controlling this 4-way valve, but instead of the sample feed system, the present invention can also be realized by arranging new valves near an upper seal portion and a lower seal portion of the continuous centrifuge 1. The effects of the pressure fluctuation and the flow speed fluctuation can be expected in the case where a valve is arranged as close as possible to the centrifugal separation portion to perform the opening/closing operation. The control device responsible for the valve control may be arranged on the sample feed system side, or may be arranged on the continuous centrifuge 1 side.

In addition, the pipe used for connecting to the sample feed system and the continuous centrifuge 1 may be a tube such as a silicon tube, but in the case where an SIP is incorporated or the like, the pipe may also be a stainless pipe. An automatic pinch valve may be used if the pipe is a tube pipe, an automatic diaphragm valve may be used if the pipe is a stainless pipe, and the type of the valve does not matter as long as the pipe has a function of opening and closing the flow path. Furthermore, without being limited to a component called a valve, the same effect can be expected as long as the component has a function of blocking the flow path.

According to the example, the total number of times of the switching between the top feed and the bottom feed is set to X, the number of times of the operation of the automatic valve which is opened after the pressure is increased to the pressure threshold P is set to Y times at each switching, the opening/closing interval time of the automatic valve is set to T1, T2, and T3, and the above X, Y, and T1, T2, and T3 are stored in the microcomputer 52 as parameters, and thereby the air releasing process can be performed fully automatically using the microcomputer 52. If the bubbles remaining in the rotor are automatically removed before the high-speed rotation of the rotor 100, the liquid sending pressure of the sample during the centrifugal separation working can be kept low, the continuous supply of the sample to the rotor 100 can be stable, and a good centrifugal separation performance can be obtained.

Although the present invention is described above on the basis of the example, the present invention is not limited to the above-described example, and various changes may be made without departing from the gist of the present invention. For example, in the continuous centrifuge 1 of the example described above, the example of the bottom feed in which the sample to be separated is put into the rotor 100 from the lower pipe 72 has been described, but the present invention is not limited thereto. The case of the centrifugal separation working by the top feed may also be applied similarly in which the sample is put into the rotor 100 from the upper pipe 82 and the waste liquid or the separated sample is collected into the collection tank 86 from the lower pipe 72.

What is claimed is:

1. A continuous centrifuge, comprising: a cylindrical rotor for separating a sample, a centrifuge chamber in which the rotor is accommodated, a drive mechanism for rotating the rotor, and a sample line for continuously supplying and discharging the sample to the rotor during rotation of the rotor, wherein a control device which controls centrifugal separation working to perform an air discharge mode in a manner that an operation is performed in which the sample is alternately flowed to the rotor by top feed and bottom feed while the rotor is rotated, and an operation is performed in which the sample line is temporarily throttled in a manner as increasing a flow speed of the sample line after switching a feed direction, and then the sample line is opened.

2. The continuous centrifuge according to claim 1, wherein the sample line comprise: a sample supply line connected to a sample tank, a sample discharge line connected to a collection tank, an upper line joined to an upper passage of the rotor, and a lower line joined to a lower passage of the rotor; and the sample supply line, the sample discharge line, the upper line and the lower line are bridge-connected and each of four valves is arranged in each of four bridges, respectively.

3. The continuous centrifuge according to claim 2, wherein the valves are operated to be opened and closed independently by the control device which controls centrifugal separation working; and the control device a) sets a sample supply direction to the rotor to top feed or bottom feed by opening only two of the four valves which face each other, b) closes the valve located on a discharge side among the opened valves after the sample is discharged from the rotor to make a flow path pressure reach a predetermined peak pressure, and then opens the valve located on the discharge side again to return the flow path pressure to a normal state, c) closes the two valves opened in the Step a) and opens the rest of the valves to reverse the sample supply direction to the rotor, and d) discharges bubbles in the rotor by repeating the Step b) and the Step c).

4. The continuous centrifuge according to claim 3, wherein in the Step b), by repeating, multiple times, two operations comprising an operation of closing the valve located on the discharge side for a short time and an operation of opening the valve for a certain time, a state in which the flow path pressure reaches the predetermined peak pressure is generated multiple times.

5. The continuous centrifuge according to claim 3, wherein the repeating step of d) is executed multiple times.

6. The continuous centrifuge according to claim 3, wherein the four valves are arranged outside the centrifuge chamber, and are opened and closed using compressed air or electric power as a power source.

7. The continuous centrifuge according to claim 6, wherein the rotor comprises a cylindrical rotor body, an upper rotor cover and a lower rotor cover which are attached so as to close an upper opening and a lower opening of the rotor body, and a core which partitions an interior into a plurality of spaces for separating the sample, and the upper line is connected to the upper rotor cover on an upper side of a rotation axis of the rotor body, and the lower line is connected to the lower rotor cover on a lower side of the rotation axis of the rotor body.

8. The continuous centrifuge according to claim 7, wherein the core comprises a hollow cylindrical body portion in which blade-shaped partition walls evenly dividing the interior of the rotor into the plurality of spaces are protruded on an outer circumferential portion, and end surface portions which are arranged in a manner as closing an upper end and a lower end of the body portion.

9. The continuous centrifuge according to claim 8, wherein a liquid sending pump and a pressure gauge are arranged in the sample supply line, and the opening and closing of the valve located on the discharge side in the Step b) is controlled by the control device based on output of the pressure gauge.

10. The continuous centrifuge according to claim 1, wherein a flow path limiting mechanism is arranged in the sample supply line for increasing the flow path pressure on a downstream side of the rotor when the top feed or the bottom feed is set.

11. An air discharge method for a continuous centrifuge, wherein the continuous centrifuge comprises: a cylindrical rotor for separating a sample, a centrifuge chamber in which the rotor is accommodated, a drive mechanism for rotating the rotor, a sample line for continuously supplying and discharging the sample to the rotor during rotation of the rotor, and a control device which controls centrifugal separation working, and in the continuous centrifuge, bubbles in the rotor are discharged in a manner that a) an operation is performed in which the sample is alternately flowed to the rotor by top feed and bottom feed while the rotor is rotated, and b) an operation is performed in which the sample line is temporarily throttled in a manner as increasing a flow speed of the sample line after switching a feed direction, and then the sample line is opened.

12. The air discharge method for a continuous centrifuge according to claim 11, wherein the sample line comprise: a sample supply line connected to a sample tank, a sample discharge line connected to a collection tank, an upper line joined to an upper passage of the rotor, and a lower line joined to a lower passage of the rotor;

the sample supply line, the sample discharge line, the upper line and the lower line are bridge-connected and each of four valves is arranged in each of four bridges, respectively; and the control device c) sets a sample supply direction to the rotor to top feed or bottom feed by opening only two of the four valves which face each other, d) closes the valve located on a discharge side among the opened valves after the sample is discharged from the rotor to make a flow path pressure reach a predetermined peak pressure, and then opens the valve located on the discharge side again to return the flow path pressure to a normal state, e) closes the two valves opened in the Step c) and opens the rest of the valves to reverse the sample supply direction to the rotor, and f) discharge bubbles in the rotor by repeating the Step d) and the Step e).

13. The air discharge method for a continuous centrifuge according to claim 12, wherein in the Step d), by repeating, multiple times, two operations comprising an operation of closing the valve located on the discharge side for a short time and an operation of opening the valve for a certain time, a state in which the flow path pressure reaches the predetermined peak pressure is generated multiple times.

14. The air discharge method for a continuous centrifuge according to claim 13, wherein the repeating step of f) is executed multiple times.

* * * * *